United States Patent [19]

Stelts

[11] Patent Number: 5,603,749

[45] Date of Patent: Feb. 18, 1997

[54] APPARATUS AND METHOD FOR VACUUM TREATING MOLTEN STEEL

[75] Inventor: Philip D. Stelts, Center Valley, Pa.

[73] Assignee: Bethlehem Steel Corporation, Del.

[21] Appl. No.: 399,685

[22] Filed: Mar. 7, 1995

[51] Int. Cl.⁶ .................................................. C21C 7/10
[52] U.S. Cl. ........................................ 75/511; 266/211
[58] Field of Search ............................. 75/511; 266/211

[56] References Cited

U.S. PATENT DOCUMENTS

| | | | |
|---|---|---|---|
| 2,054,923 | 9/1936 | Betterton et al. | 266/34 |
| 2,893,860 | 7/1959 | Lorenz | 75/49 |
| 3,033,550 | 5/1962 | Harders | 266/34 |
| 3,099,699 | 7/1963 | Breuing et al. | 266/34 |
| 3,136,834 | 6/1964 | Lorenz | 266/34 |
| 3,201,226 | 8/1965 | Spolders et al. | 75/49 |
| 3,310,296 | 3/1967 | Taylor | 266/34 |
| 3,310,850 | 3/1967 | Armbruster | 22/73 |
| 3,508,743 | 4/1970 | Erdelyi | 266/34 |
| 3,521,873 | 7/1970 | Matsuda | 266/34 |
| 3,606,291 | 9/1971 | Schneider | 266/34 |
| 3,798,025 | 3/1974 | Ramachandran et al. | 75/49 |
| 3,820,767 | 6/1974 | Metz | 266/34 T |
| 3,821,031 | 6/1974 | Kubotera et al. | 148/2 |
| 4,104,057 | 8/1978 | Maas et al. | 75/49 |
| 4,241,904 | 12/1980 | Nagashima et al. | 266/209 |
| 4,251,269 | 2/1981 | Hoshi et al. | 75/60 |
| 4,541,865 | 9/1985 | Sherwood | 75/46 |
| 4,612,044 | 9/1986 | Kutscher | 75/49 |
| 5,024,421 | 6/1991 | Cooley | 266/210 |
| 5,047,081 | 9/1991 | Tanabe et al. | 75/555 |
| 5,058,865 | 10/1991 | Robertson et al. | 266/209 |
| 5,091,000 | 2/1992 | Ishii et al. | 75/508 |
| 5,152,831 | 10/1992 | Yamaguchi et al. | 75/512 |
| 5,221,326 | 6/1993 | Yamaguchi et al. | 75/512 |
| 5,242,485 | 9/1993 | Dittrich | 75/510 |
| 5,316,566 | 5/1994 | Defays | 75/10.39 |
| 5,332,417 | 7/1994 | Bauvois | 75/510 |
| 5,454,854 | 10/1995 | Harashima | 75/10.39 |
| 5,520,373 | 5/1996 | Keilman et al. | 266/209 |
| 5,520,718 | 5/1996 | Keilman et al. | 75/508 |

FOREIGN PATENT DOCUMENTS

| | | | |
|---|---|---|---|
| 1183524 | 12/1964 | Germany . | |
| 5252110 | 4/1977 | Japan . | |
| 4235213 | 8/1992 | Japan | 75/511 |
| 5214430 | 8/1993 | Japan . | |
| 754034 | 2/1995 | Japan . | |
| 7113114 | 5/1995 | Japan . | |
| WO9429488 | 6/1994 | WIPO . | |
| WO9420643 | 9/1994 | WIPO . | |

OTHER PUBLICATIONS

Patent Abstracts of Japan, Nippon Steel Corp., Aug. 24, 1977 vol. 001, No. 091 (C-023) & JP,A,52 052110.

The Making, Shaping & Treating of Stell, 9th ed., pp. 596–598, 1970.

ASM Handbook, published 1988, pp. 426–427.

*Primary Examiner*—Melvyn Andrews

[57] ABSTRACT

An apparatus for vacuum treating molten steel includes a ladle having a sidewall, a substantially circular closed bottom, and an open top. A first gas injector is operably associated with the bottom for introducing a supply of a selected first gas into the ladle. A barrel degasser is operably associated with the ladle for being introduced into the ladle through the open top. The degasser includes a generally cylindrical shell having a single substantially continuous diameter opening them through defining a treatment space. A second gas injector is radially directed and operably associated with the shell for communicating with the treatment space. A source of the first gas is in flow communication with the first and second injectors. A vacuum source is operably associated with the barrel degasser for applying a vacuum to the treatment space.

46 Claims, 6 Drawing Sheets

APPARATUS AND METHOD FOR VACUUM TREATING MOLTEN STEEL

FIELD OF THE INVENTION

The disclosed invention is to an apparatus and method for vacuum treating molten steel. More specifically, the invention is to an apparatus and method in which a vacuum degasser has a single substantially continuous diameter opening therethrough defining a treatment space, into which space molten steel contained in a ladle is received, with inert gas being bubbled in the ladle in order to cause steel to be lifted into the degasser and also being radially directed within the degasser to move the thus lifted steel laterally for return to the ladle so that mixing will occur. In a further feature of the invention, a reactive gas is also directed radially within the degasser to promote a desired reaction.

BACKGROUND OF THE INVENTION

Vacuum treatment of molten steel is utilized in order to enhance one or more properties of the finished steel. For example, carbon removal is improved through the application of vacuum degassing without the addition of oxygen into the steel bath. However, the vacuum degassing apparatus gives a user the added option of introducing oxygen into the molten bath to form carbon monoxide which is then removed by the degassing unit. Alternatively, the steel may also be treated with one or more gases during the vacuum treatment time, and/or one or more alloying elements may also be added.

One conventional vacuum degassing process is the RH-OB system used primarily for the removal of hydrogen and/or a certain amount of carbon from the steel. The RH-OB process uses a refractory-lined vacuum vessel having two vertically depending legs or snorkels, an alloy addition hopper, a mechanism for raising and lowering the vacuum vessel into the ladle, and a steam ejector system. The RH-OB process not only introduces an inert lift gas into one of the legs through a gas inlet pipe to facilitate flow of the metal, but also gives the user the option of introducing oxygen into the molten bath when desired. The inert gas lifts the metal in the one leg and the metal leaves through the other leg, with the introduction of oxygen assisting in the decarburization of the liquid steel.

While the RH-OB process and its equipment are useful in the vacuum treatment of molten steel, a number of disadvantages have arisen because of the two legs which are immersed into the molten steel. The refractory material in the bottom section of the RH-OB vessel is complicated, expensive, and subject to rapid wear. The snorkels may plug, and maintenance of the snorkels and the vessel bottom is correspondingly difficult.

Those skilled in the art will understand that there is a need for a method and apparatus for vacuum treating molten steel which overcomes the disadvantages realized with the RH-OB method and apparatus. The disclosed invention meets those needs by providing a barrel-type degasser having a single substantially continuous diameter opening which avoids the need for two snorkels and eliminates the wear which occurs at the complex vessel bottom and snorkel throat sections.

OBJECTS AND SUMMARY OF THE INVENTION

The primary object of the disclosed invention is a method and apparatus for vacuum treating molten steel through the use of a degasser having a single substantially continuous diameter opening therethrough defining a treatment space resembling an inverted open-ended barrel immersed in the molten steel bath of a steelmaking ladle, the steelmaking ladle having a porous plug for bubbling inert lift gas into the molten steel bath so that steel is lifted into the open-end portion of the inverted barrel for treatment, the treatment space including means to simultaneously and radially inject additional inert gas into the treatment space to further lift the molten steel within the degasser while at the same time imparting a lateral flow to the steel in order to enhance mixing thereof.

An apparatus for vacuum treating molten steel comprises a ladle including a sidewall, a closed bottom, and an open top. A first gas injector is operably associated with the bottom for introducing a supply of a selected first lift gas into the ladle. A degasser is operably associated with the ladle for being introduced into the ladle through the open top. The degasser includes a shell having a single substantially continuous diameter opening therethrough defining a treatment space resembling an open-ended barrel. A second gas injector is radially directed and operably associated with the shell for communicating with the treatment space. A source of the first gas is in flow communication with the first and second injectors and is valved to provide either a separate or simultaneous first gas flow to the first and second injectors. A vacuum source is operably associated with the degasser for applying a vacuum to the treatment space.

An apparatus for vacuum treating molten steel comprises a ladle including a sidewall, a substantially circular closed bottom, and an open top. A first gas injector is disposed in the bottom for introducing a supply of a selected first gas into the ladle. A degasser is operably associated with the ladle for being introduced into the ladle through the open top. The degasser includes a shell having a single substantially continuous diameter opening therethrough defining a treatment space resembling an open-ended barrel. Second and third gas injectors are radially directed and carried by the shell for communicating with the treatment space. A source of the first gas is in flow communication with the first and second injectors, and a source of the second gas is in flow communication with the third injector. A vacuum source is operably associated with the degasser for applying a vacuum to the treatment space.

A method for vacuum treating molten steel comprises the steps of providing a ladle containing a supply of molten steel. A degasser having a shell with a substantially continuous diameter opening therethrough defining a treatment space resembling an open-ended barrel is immersed into the steel within the ladle, so that some of the molten steel is received within the treatment space. A supply of an inert lift gas is bubbled into the steel within the ladle so that the gas causes molten steel to be lifted into the treatment space. At least a first stream of an inert gas is directed radially within the treatment space from the shell, so that the stream intersects with steel being lifted by the lift gas and thereby enhancing vertical lift of the steel and causing lateral flow of the molten steel within the degasser. A vacuum is applied to the degasser.

These and other objects and advantages of the invention will be readily apparent in view of the following description and drawings.

DESCRIPTION OF THE DRAWINGS

The above and other objects and advantages and novel features of the present invention will become apparent in the following detailed description of the preferred embodiment of the invention illustrated in the accompanying drawings, wherein.

DESCRIPTION OF THE INVENTION

Figure 1:
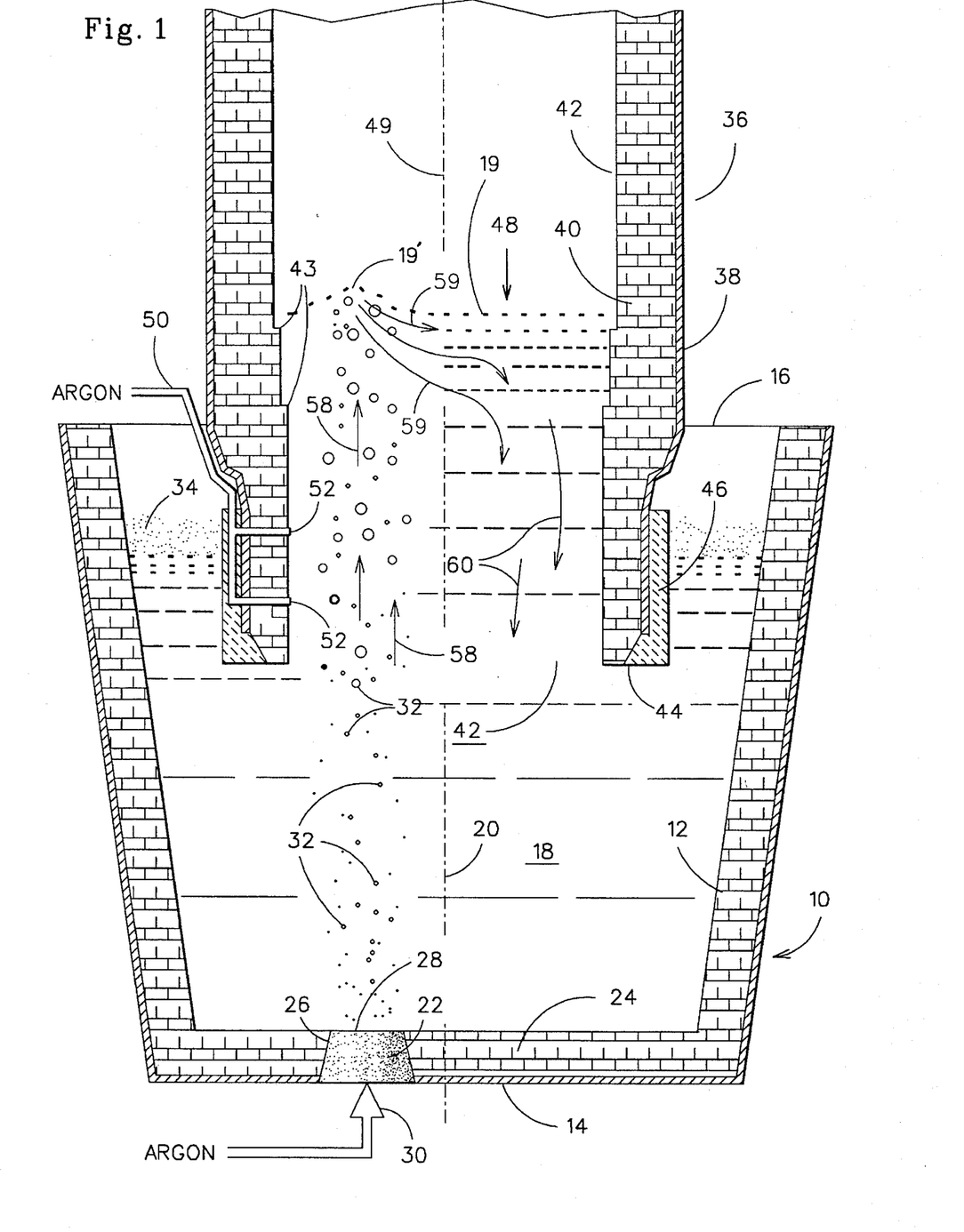
FIG. 1 is a fragmentary cross-sectional view of a first embodiment of the degasser of the invention positioned within a ladle.

Referring to FIG. 1 of the drawings, ladle 10 is a refractory lined vessel having a sidewall 12, a substantially circular closed bottom 14, and an open top 16. Those skilled in the art recognize that the ladle 10 may have any number of sizes and shapes, and that ladle 10 will typically have an outer shell surrounding the refractory lining 24 which is provided to withstand the heat of the molten steel 18 within the ladle. The illustrated ladle has a frustoconical configuration in vertical section, but the configuration is not critical to practice of the invention.

Bottom 14 of ladle 10 includes a porous plug 22 positioned within the refractory lining 24. Plug 22 is positioned within bottom 14 and radially spaced from the central axis 20 of ladle 10. Lining 24 has an opening 26 in order to permit top surface 28 of plug 22 to communicate with the molten steel 18 within ladle 10. A gas supply line 30 communicates with plug 22 in order to supply an inert gas thereto, such as argon. Because of the porous nature of plug 22, then the argon gas supplied through supply line 30 permeates the plug 22 and creates an upwardly directed stream 32 of gas lift bubbles within the steel bath 18. Because plug 22 is offset relative to axis 20, the steel which is lifted via the gas lift bubbles 32 will also be offset from the axis.

The molten steel 18 typically will have a slag layer 34 across its top, the slag containing any number of impurities and components.

Barrel degasser 36 has an outer steel shell 38 lined with a refractory material 40. The refractory material 40 may be of the castable type, or it may be of brick type. Whatever its type, the refractory material 40 extends about the inner cylindrical contour of shell 38 and provides therein a substantially continuous diameter opening 42 which extends through degasser 36 to bottom 44. Thus an opening is provided in bottom 44 through which molten steel 18 may enter in order to be treated in degasser 36. A protective refractory lining 46 may extend about the lower external portion of barrel degasser 36 in order to provide protection for that portion of the shell 38 which is to be immersed within the molten steel bath 18 within the ladle 10 during the vacuum treatment. While the opening 42 may have one or more steps 43 or other discontinuities along its length, the opening 42 is a single opening which causes a treatment space 48 to be defined within the lower portion of barrel degasser 36. Because of the substantially continuous diameter of opening 42 and the opening thereof in bottom 44, the treatment space 48 resembles an open-ended barrel. Hence, degasser 36 is herein called a "barrel degasser". Thus, unlike the RH-OB apparatus, there is a single volume in which the treatment takes place, with steel being lifted therein and then subsequently flowing therefrom through the single opening in bottom 44.

Figure 2:
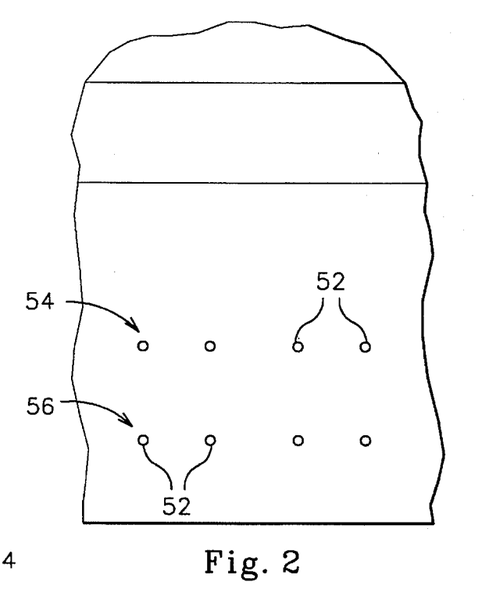
FIG. 2 is a fragmentary elevational view illustrating the gas injectors carded by the shell of the degasser of FIG. 1.

As best shown in FIGS. 1 and 2, inert gas supply line 50 provides argon gas to gas injector nozzles 52 which extend through shell 38 and refractory lining 40. I prefer that there be a plurality of gas nozzles 52 extending equiangularly about a portion of the circumference of opening 42 in the lower portion of degasser 36, such as about a quadrant thereof. The nozzles 52 may be arranged in two or more tiers or layers 54 and 56, respectively, as best shown in FIG. 2, in order to assure an adequate amount of argon gas without requiring excessive pressure. Those skilled in the art will recognize that the volume of gas flowing through a nozzle, such as the nozzles 52, is a function of the diameter of the nozzle, with more pressure being required for a given diameter if added mass is required. However, excess pressure may create too much turbulence and cause premature refractory wear within the treatment space 48.

The gas nozzles 52 extend about the shell 38 of the degasser 36 in approximately the same quadrant as the gas bubbles 32 are oriented by virtue of plug 22. The gas nozzles 52 are radially directed relative to the shell 38 and axis 20, with the result that the argon gas stream from the gas nozzles 52 causes the steel which has been lifted into the treatment space 48 by the bubbles 32 ascending from plug 22 in the ladle bottom. As shown by arrows 58, argon is supplied continuously to plug 20 to provide a continuous column of molten steel 58 moving upwardly into the treatment space 48 of the barrel degasser 36 through the opening in bottom 44. The inert gas injected from nozzles 52 provides additional lift to move the molten steel in the treatment space toward surface 19. As shown by arrows 59, the additional lift creates a swell 19', on bath surface 19, and generates a radial flow of molten steel toward the opposite side of opening 42 as the liquid steel falls from the swell to the bath surface 19. It can be seen that the column 58 of steel generated by the bubbles 32 is offset also from the axis 49 of degasser 36, with the axis 49 being aligned with the axis 20 as best shown in FIG. 1. The thus moved steel then falls downwardly through the opening in bottom 44 into the ladle 10 in order to return to the molten steel 18 therein. In this way, steel 18 flows continuously and is mixed in ladle 10. Arrows 58 illustrate the upward flow column of the steel generated by bubbles 32, arrows 59 illustrate the radial flow of liquid steel away from the upward flow column 58, and arrows 60 illustrate the downward flow column of steel flowing back into ladle 10. Because of the plug 22 and the nozzles 52, then there is an upwardly flowing column of molten steel from ladle 10 into treatment space 48, and a downwardly flowing diametrically spaced column of molten steel from treatment space 48 into ladle 10. These columns assure that a good mix is achieved as treatment progresses, and eliminates the need for the snorkels of the RH-OB system.

I prefer that there be at least eight gas injector nozzles 52 arrayed about the internal circumference of the barrel degasser 36. In the preferred embodiment there are four nozzles in the tier 54, and four nozzles in the tier 56. Preferably the argon gas flow through of the eight injector nozzles 52 collectively exceeds the gas flow provided by plug 22.

The degasser 36 may be provided with a mechanical means, (not shown) for lowering the degasser into the ladle 10 to a level sufficient to cause the bottom 44 to be immersed into the molten steel 18 so that sufficient steel fills the treatment space 48. A vacuum source communicates with the opening 42 in barrel degasser 36, in order to cause a vacuum to be applied to the treatment space 48. Alternatively, degasser 36 may be fixed in elevation and ladle 10 may be adapted to be moved vertically to accomplish the same immersion so that gases evolved from the steel are withdrawn. Similarly, one or more alloy addition devices may be provided for communication with the steel 18 through the barrel degasser 36.

Figure 3:
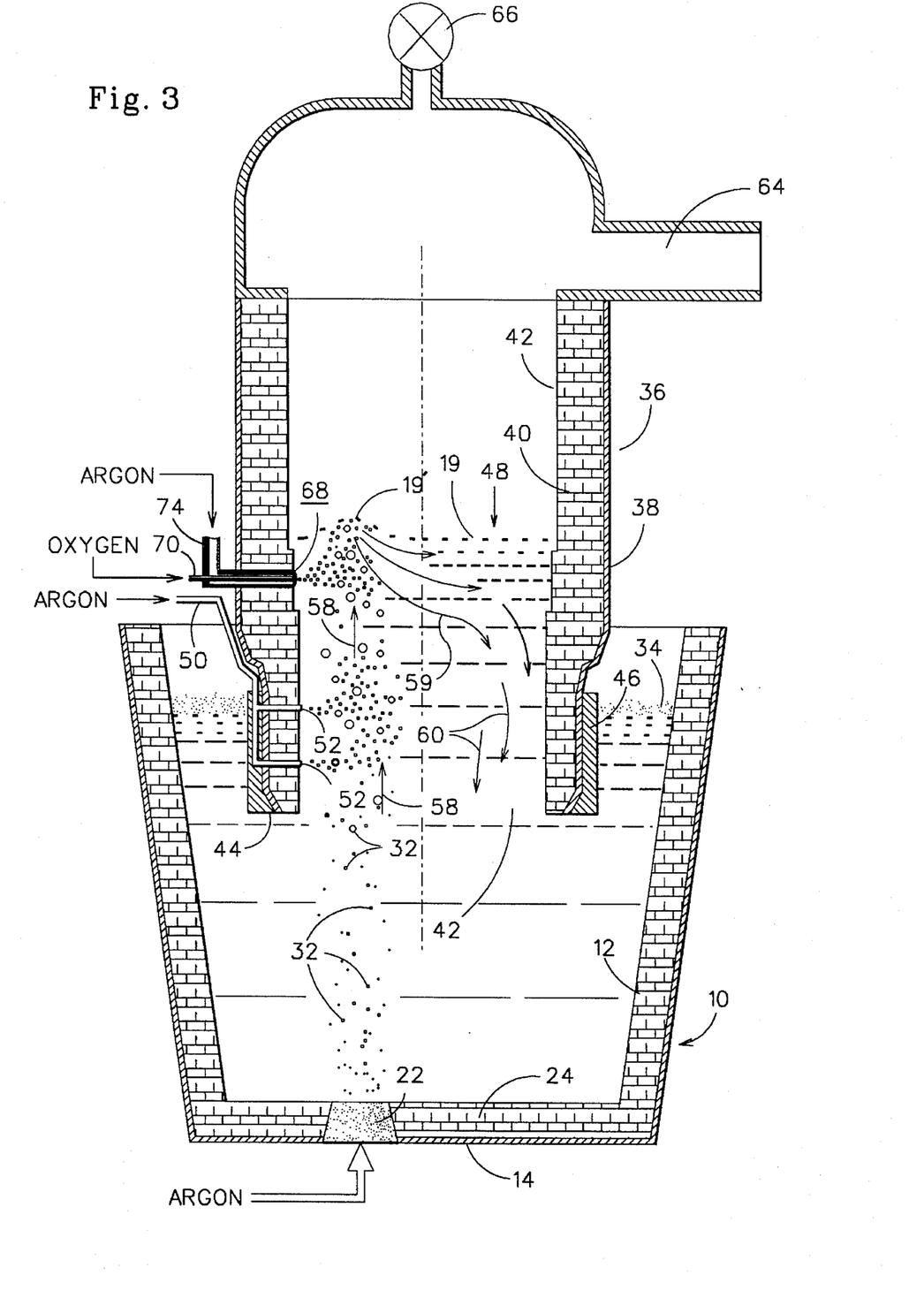
FIG. 3 is a cross-sectional view of a second embodiment of the degasser of the invention positioned within a ladle.
Figure 4:
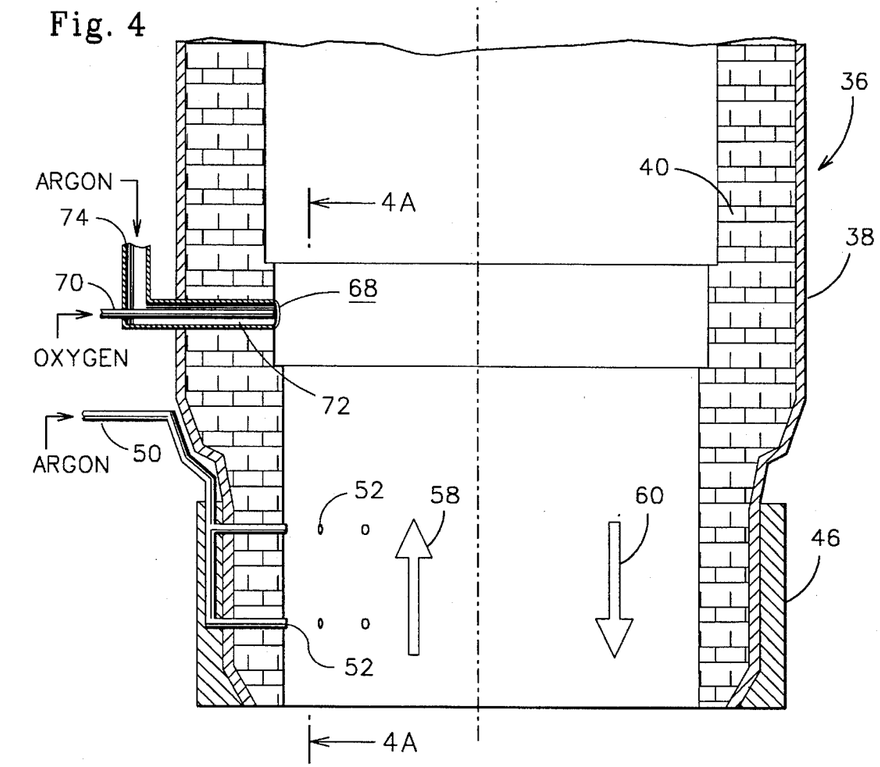
FIG. 4 is a fragmentary cross-sectional view of the degasser of FIG. 3.
Figure 4A:
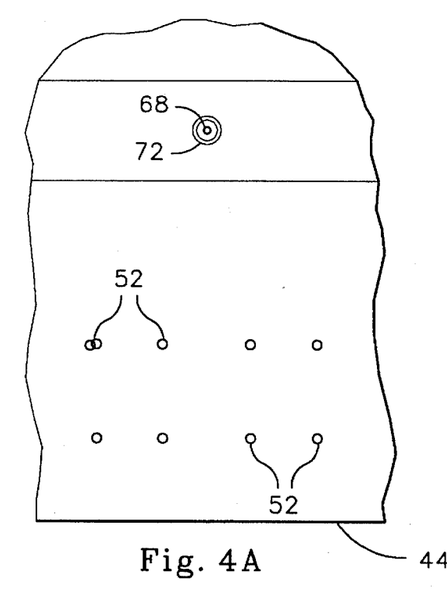
FIG. 4a is a fragmentary elevational view taken along the line 4a–4a of FIG. 4.

FIGS. 3 and 4 illustrate a vacuum degasser and ladle substantially similar to the degasser 36 and ladle 10 of FIG. 1, with like numbers indicating like parts. FIG. 3 illustrates the vacuum offtake 64 and alloy addition device 66 which each communicate with barrel degasser 36, as earlier noted.

As best shown in FIGS. 3 and 4, in addition to the gas injector nozzles 52 extending about the bottom portion of degasser 36, I also provide a nozzle 68 supplying a reactive gas, such as oxygen. Nozzle 68 is radially directed relative to shell 38 and introduces oxygen in order to permit decarburization and/or heating of the steel bath to occur. An oxygen supply line 70 supplies the oxygen to the nozzle 68 for a period sufficient to permit decarburization or reheating to occur. Nozzle 68 is axially spaced above the nozzles 52 in order not to interfere with the gas streams emanating from nozzles 52. Those skilled in the art will understand that the vacuum degassing process typically will take longer than the time required for decarburization, so oxygen flow to the nozzle 68 will normally be terminated while argon supply to the plug 22 and nozzles 52 continues. For this reason, I furnish a further gas nozzle 72 to provide argon shielding about the oxygen supply line 70. Nozzle 72 is supplied with argon gas through line 74 and the argon shielding reduces early erosion of refractory adjacent materials nozzle 68. The argon supply lines 30, 50, and 74 may all be from a common argon source, although naturally each will have an independent control valve. Therefore, because of the independent control valves, it is possible for an operator to inject inert gas from nozzles 52 without injecting bottom bubbling gas into ladle 10 from porous plug 22. Also, I provide argon gas through the nozzle 68 in order to prevent the opening through which the nozzle 68 extends from becoming blocked or clogged by contaminants, slag, or the like. Because gas flows continuously through the opening from gas lines 70 and 72 of nozzle 68, the possibility of blockage is substantially eliminated.

Water modeling of the barrel degasser of the invention was undertaken in order to ascertain whether "dead spots" might occur because of poor circulation within the ladle, and whether large amounts of slag could be trapped inside the degasser during insertion of the degasser into the ladle. A water model sized to approximately 1/20th scale was constructed in order to evaluate these concerns.

Figure 5:
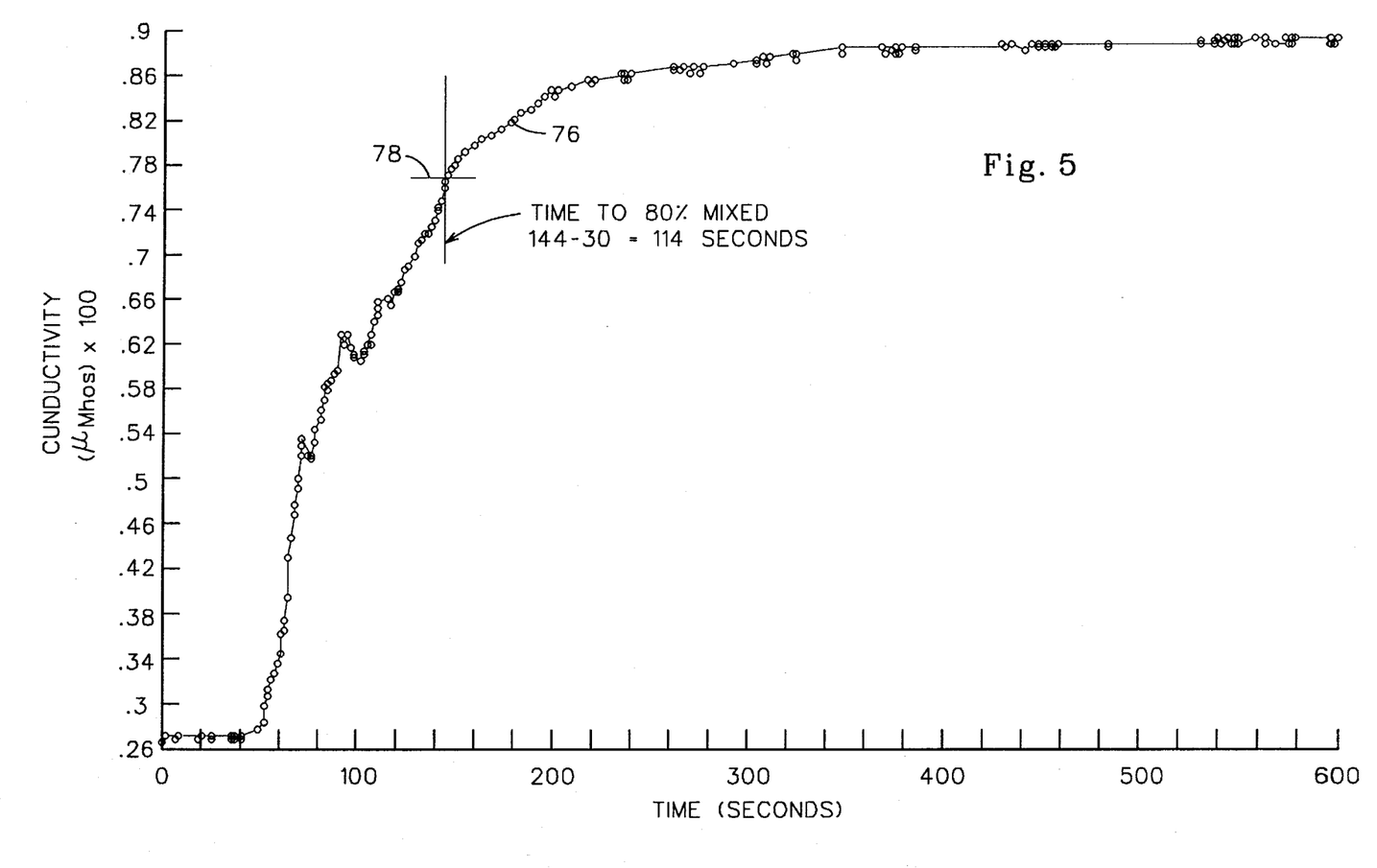
FIG. 5 is a graph illustrating conductivity versus mix time for a salt solution introduced into a water model of the 5present degasser.

FIG. 5 is a graph illustrating conductivity versus time for an electrically conductive water solution, with electrical conductivity being measured at eight locations about the ladle. The material providing the conductivity was sodium chloride or salt. Conductivity was measured near the top and bottom of the "ladle", at 90° intervals thereabout.

As illustrated in FIG. 5, the initial conductivity of the water is at a low level. The conductivity climbed rapidly after a concentrated salt solution is added into the degasser model until a relatively high, substantially constant level is achieved. An adequate mix was believed to be achieved when the conductivity reached 80% of its maximum. The curve 76 of FIG. 5 illustrates the results of one of the calibration experiments, with the point 78 occurring at the 80% mix level and taking approximately 114 seconds from the addition of salt.

Figure 6:
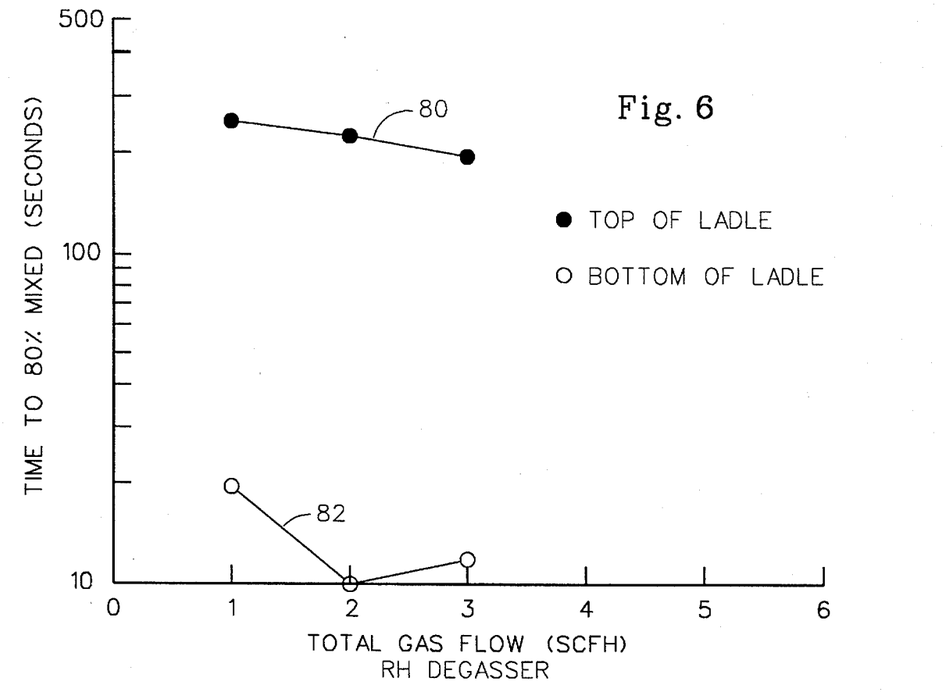
FIG. 6 is a graph illustrating the time to achieve an 80% mix for the salt solution of FIG. 5 versus total gas flow for a water model of a conventional RH degasser.

FIG. 6 illustrates the time required for the 80% mix level to be reached for a scaled two-snorkel degasser model as a function of gas flow. The curve 80 illustrates the results measured at the top of the ladle, with the curve 82 illustrating the results measured at the bottom of the ladle. Gas flow was measured in standard cubic feet per hour ("SCFH"), with results being monitored at 1, 2, and 3 SCFH. In the experiment illustrated in FIG. 6, the bottom of the ladle is mixed much faster than the top of the ladle, as clearly shown by a comparison of curves 80 and 82. It can be further seen that higher gas flow rates improves the results, and has a more advantageous effect on the bottom curve 82 than the top curve 80. The time to the 80% mix level was plotted versus the up leg gas flow rate, and each point in the curves represents the average of the four quadrant results at the top or bottom, respectively, of the ladle.

Figure 7:
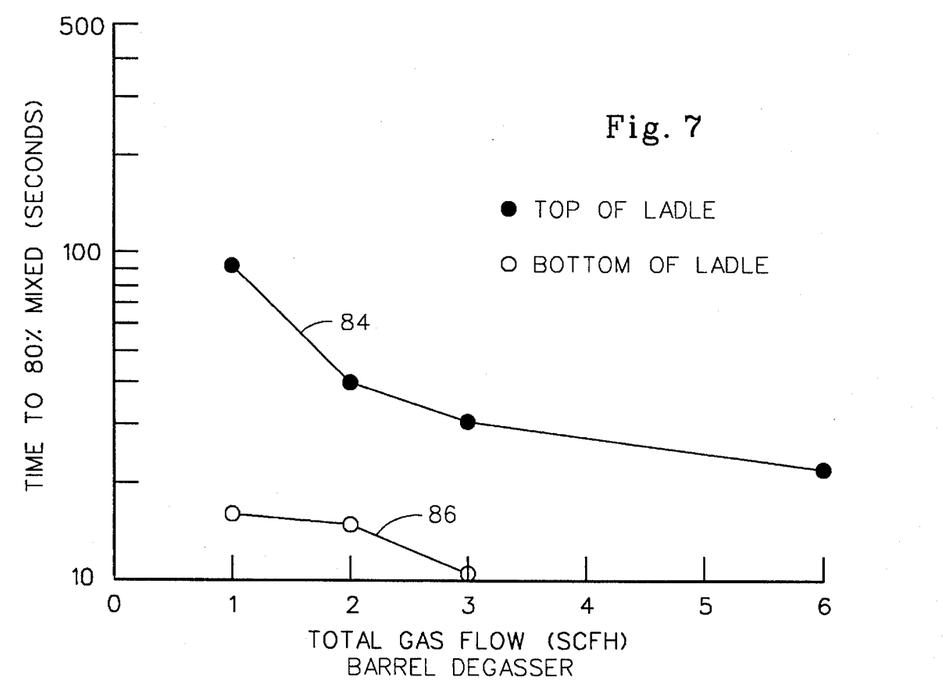
FIG. 7 is a graph illustrating time to achieve 80% mix versus total gas flow for a water model of the invention in which all gas is introduced through the ladle bottom.

FIG. 7 illustrates an experiment conducted with the barrel degasser of the invention, as modeled, with all gas being introduced through the ladle bottom. In other words, gas was introduced through the "plug" 22 only, and not through the nozzles 52. The curve 84 represents the results measured at the top of the ladle, with the curve 86 representing the results measured at the bottom of the ladle. A comparison of the curves 84 and 86 with the curves 80 and 82 establishes that the stirring or mix time at the top of the ladle when the degasser of the invention is used is much quicker than a two-snorkel degasser as represented by the curve 80 of FIG. 6. FIG. 7 alleviates the initial concerns that dead spots of poor circulation might occur in the degasser of the invention. The bottom mix curve 86 is also more rapid than the bottom mix curve 82 of FIG. 6.

Figure 8:
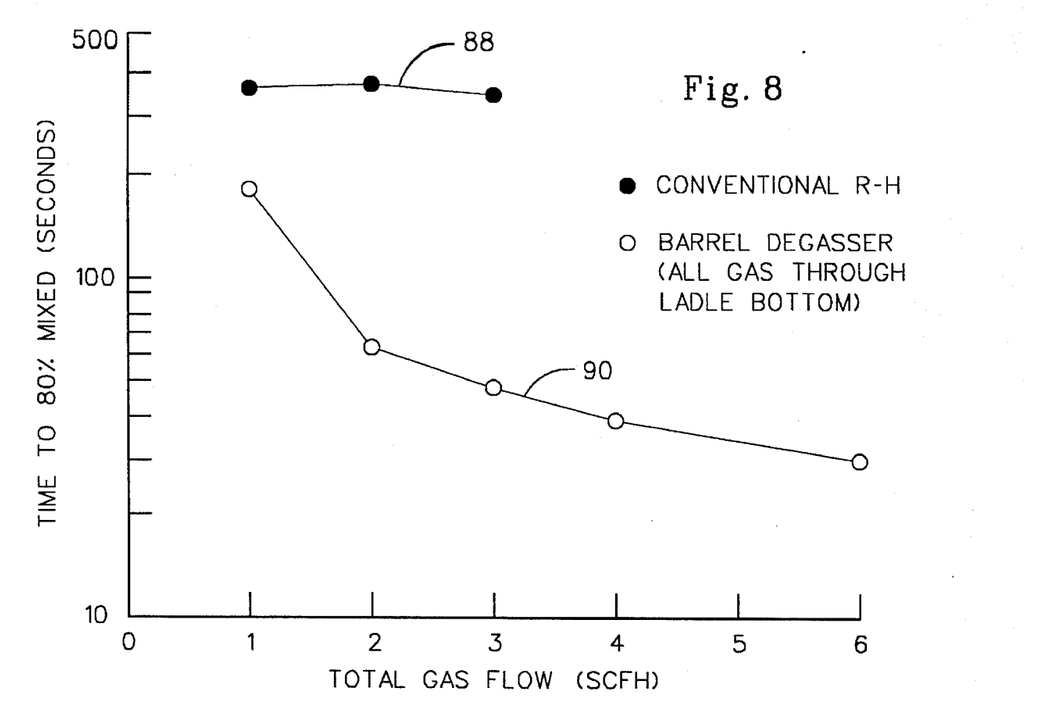
FIG. 8 is a graph illustrating time to achieve an 80% mix as a function of total gas flow for a conventional RH degasser and a water model of the invention, with all gas being introduced through the ladle bottoms.

FIG. 8 illustrate an experiment conducted with a two-snorkel degasser in curve 88, and the barrel degasser of the invention in curve 90. In FIG. 8, all gas is introduced through the bottom, with no side injection. FIG. 8 discloses the single slowest 80% mix time for both the barrel degasser of the 2present invention and the two-snorkel degassers conventionally used. Comparison of curve 90 showing the mix time for the present barrel degasser, with curve 88 showing the mix time for a conventional two-snorkel degasser, discloses that the barrel degasser has much faster mixing rate than a conventional two-snorkel degasser.

Figure 9:
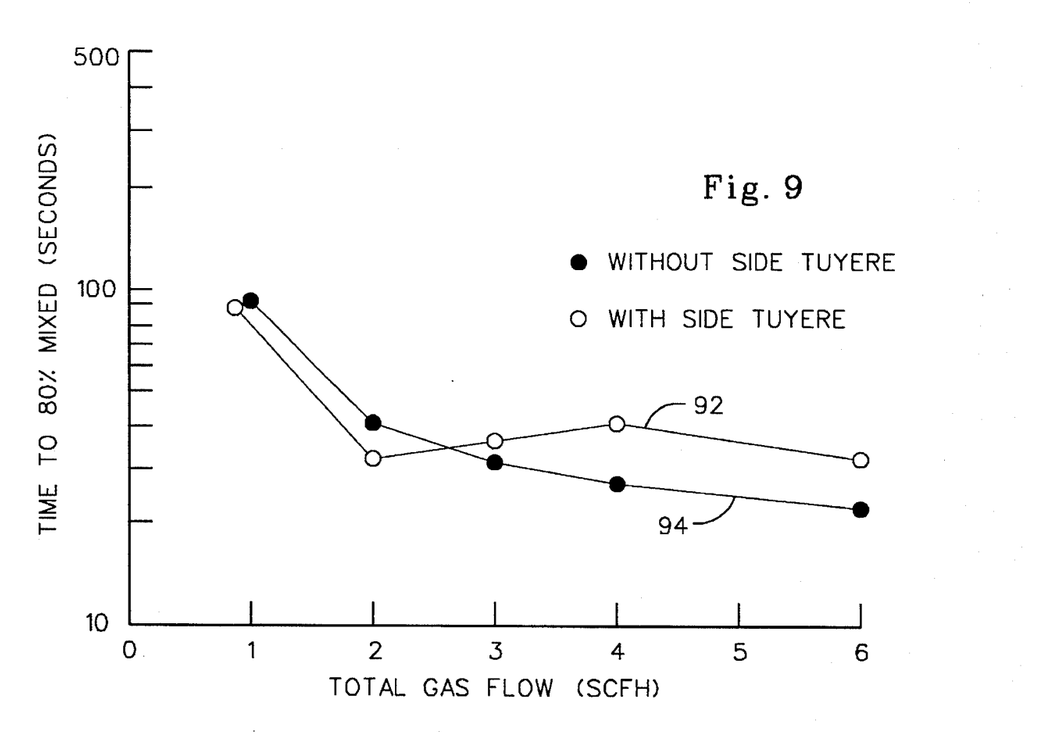
FIG. 9 is a graph comparing the time to achieve an 80% mix versus total gas flow for a water model of the invention with gas introduced through the degasser and ladle and through the ladle bottom alone.

FIG. 9 illustrates an experiment in which the gas flow was split equally between the porous plug 22 in the bottom and the side injectors 52. The curve 92 illustrates the mixing achieved when gas is introduced through the nozzles 52 and the plug 22. The curve 94 illustrates the results achieved when gas is introduced only through the porous plug 22 at the bottom of the ladle. Surprisingly, the results are substantially similar for split flow as for introducing all the gas through the ladle bottom. These results are important because in commercial operation it may prove difficult to introduce enough stirring gas through the ladle bottom. This is because high gas injection rates introduced through the ladle bottom tend to produce increased localized wear of the ladle lining. Introducing some of the gas through the injectors 52 alleviates those potential problems. A further advantage of the nozzles 52 is that barrel degasser stirring times without the bottom stirring gas provided by the porous plug are about the same as for a conventional two-snorkel system, but slower than with bottom stirring. This indicates that if the bottom system fails, then it may still be possible to effectively degas in the barrel degasser using the injectors 52 alone. Further, in operations where porous plugs are not, or can not be installed, effective vacuum degassing is still possible through the use of the barrel degasser of the present invention.

I also modeled the effect of slag entrapment by providing a supply of a low density oil on top of the water to simulate slag. Qualitative results showed that by using a high bottom gas stirring rate during barrel degasser insertion, most of the slag was pushed to the sides of the ladle and slag entrapment was moderate within the degasser. Slag that was trapped gradually left the degasser. This indicates that slag entrapment should not be a problem if ladle slag depth and composition are properly controlled.

While this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

What I claim is:

1. Apparatus for vacuum treating molten steel, comprising:
   a) a ladle including a sidewall, a substantially closed bottom, and an open top;
   b) a first gas injector operably associated with said bottom for introducing a supply of a selected first gas into said ladle;
   c) a barrel degasser operably associated with said ladle for being introduced into said ladle through said open top, said degasser including a shell having a single substantially continuous diameter opening therethrough defining a treatment space;
   d) a second gas injector radially directed and operably associated with said shell for communicating with said space;
   e) a source of the first gas in flow communication with said first and second injectors; and
   f) a vacuum source operably associated with said degasser for applying a vacuum to said space.
2. The apparatus of claim 1, wherein:
   a) said first injector is offset from the center of said bottom.
3. The apparatus of claim 2, wherein:
   a) said first injector is a porous plug, and said second injector is at least a first gas nozzle.
4. The apparatus of claim 3, wherein:
   a) there is a plurality of gas nozzles, said nozzles being angularly disposed about a portion of the circumference of said shell.
5. The apparatus of claim 4, wherein:
   a) said nozzles are positioned about a quadrant of said shell.
6. The apparatus of claim 5, wherein:
   a) said nozzles are arranged in first and second tiers spaced axially along said shell.
7. The apparatus of claim 6, wherein:
   a) there is a uniform number of nozzles in each said tier.
8. The apparatus of claim 4, wherein:
   a) said nozzles are arranged in first and second tiers spaced axially along said shell.
9. The apparatus of claim 8, wherein:
   a) there is a uniform number of nozzles in each said tier.
10. The apparatus of claim 2, further comprising:
    a) a third gas injector radially directed and operably associated with said shell for communicating with said space; and
    b) a source of a second selected gas in flow communication with said third gas injector.
11. The apparatus of claim 10, wherein:
    a) said third gas injector is axially spaced above said second injector.
12. The apparatus of claim 11, wherein:
    a) there is a single third gas injector and a plurality of second gas injectors.
13. The apparatus of claim 12, wherein:
    a) said first gas injector is a porous plug, and said second and third gas injectors are each gas nozzles.
14. The apparatus of claim 13, wherein:
    a) said third gas injector is centrally disposed relative to said second gas injectors.
15. The apparatus of claim 14, wherein:
    a) said second injector gas nozzles are disposed in tiers axially spaced along said shell.
16. The apparatus of claim 10, further comprising:
    a) a fourth gas injector radially directed and operably associated with said shell for communicating with said space, said fourth gas injector surrounding said third gas injector; and
    b) said source of the first gas is in flow communication with said fourth gas injector.
17. The apparatus of claim 16, wherein:
    a) each of said third and fourth gas injectors is a gas nozzle.
18. The apparatus of claim 1, further comprising:
    a) a second gas injector radially directed and operably associated with said shell for communicating with said space; and
    b) a source of a second selected gas in flow communication with said second gas injector.
19. The apparatus of claim 18, wherein:
    a) said second gas injector is axially spaced above said first injector.
20. The apparatus of claim 19, wherein:
    a) there is a single second gas injector and a plurality of first gas injectors.
21. The apparatus of claim 20, wherein:
    a) said first gas injectors and said second gas injectors are each gas nozzles.
22. The apparatus of claim 21, wherein:
    a) said second gas injector is centrally disposed relative to said first gas injectors.
23. The apparatus of claim 22, wherein:

a) said first injector gas nozzles are disposed in tiers axially spaced along said shell.

24. The apparatus of claim 18, further comprising:
a) a third gas injector radially directed and operably associated with said shell for communicating with said space, said third gas injector surrounding said second gas injector; and
b) said source of the first gas is in flow communication with said third gas injector.

25. The apparatus of claim 24, wherein:
a) each of said second and third gas injectors is a gas nozzle.

26. The apparatus of claim 24, wherein:
a) the first selected gas is an inert gas, and the second selected gas is a reactive gas.

27. Apparatus for vacuum treating molten steel, comprising:
a) a ladle including a sidewall, a substantially circular closed bottom, and an open top;
b) a first gas injector disposed in said bottom for introducing a supply of a selected first gas into said ladle;
c) a barrel degasser operably associated with said ladle for being introduced into said ladle through said open top, said degasser including a shell having a single substantially continuous opening therethrough defining a treatment space;
d) second and third gas injectors radially directed and carried by said shell for communicating with said space;
e) a source of the first gas in flow communication with said first and second injectors, and a source of a second gas in flow communication with said third injector; and
f) a vacuum source operably associated with said degasser for applying a vacuum to said space.

28. The apparatus of claim 27, wherein:
a) said first injector is radially spaced from the center of said bottom.

29. The apparatus of claim 28, wherein:
a) said second gas injector includes a plurality of gas nozzles extending about a quadrant of said shell.

30. The apparatus of claim 29, wherein:
a) said gas nozzles are arranged in first and second tiers axially spaced along said shell.

31. The apparatus of claim 30, wherein:
a) said third gas injector is axially spaced from said gas nozzles.

32. The apparatus of claim 31, wherein:
a) said third gas injector is a gas nozzle; and
b) said first gas injector is a porous plug.

33. Method of vacuum treating molten steel, comprising the steps of:
a) providing a ladle containing a supply of molten steel;
b) immersing into the ladle and into the steel a barrel degasser having a shell with a substantially continuous opening therethrough defining a treatment space and causing some of the molten steel to be received in the treatment space;
c) bubbling a supply of an inert gas in the steel within the ladle so that the gas causes molten steel to be lifted into the treatment space;
d) radially directing at least a first stream of inert gas within the treatment space so that the stream intersects the steel being lifted and thereby causes some of the molten steel to be moved within the degasser; and
e) applying a vacuum to the degasser.

34. The method of claim 33, including the further step of:
a) radially directing a stream of a reactive gas within the treatment space and thereby causing a desired reaction to occur.

35. The method of claim 34, including the steps of:
a) providing argon as the inert gas; and
b) providing oxygen as the reactive gas.

36. The method of claim 33, including the step of:
a) causing the supply of inert gas to be bubbled on an axis offset relative to the axis of the degasser.

37. The method of claim 36, including the step of:
a) bubbling the inert gas of the supply through a porous plug carried by a closed bottom of the ladle.

38. The method of claim 37, including the step of:
a) directing a plurality of streams of the inert gas radially from the shell, the streams originating about a selected portion of the circumference of the shell.

39. The method of claim 38, including the step of:
a) arranging the streams in a plurality of tiers, one tier axially spaced above the next tier and each tier including a plurality of streams.

40. Apparatus for vacuum treating molten steel, comprising:
a) a ladle including a sidewall, a substantially closed bottom, and an open top;
b) a barrel degasser operably associated with said ladle for being introduced into said ladle through said open top, said degasser including a shell having a single substantially continuous diameter opening therethrough defining a treatment space;
c) a second gas injector radially directed and operably associated with said shell for communicating with said space;
d) a source of the first gas in flow communication with said first and second injectors; and
e) a vacuum source operably associated with said degasser for applying a vacuum to said space.

41. The apparatus of claim 40, wherein:
a) there is a plurality of gas nozzles, said nozzles being angularly disposed about a portion of the circumference of said shell.

42. The apparatus of claim 41, wherein:
a) said nozzles are positioned about a quadrant of said shell.

43. The apparatus of claim 42, wherein:
a) said nozzles are arranged in first and second tiers spaced axially along said shell.

44. The apparatus of claim 43, wherein:
a) there is a uniform number of nozzles in each said tier.

45. The apparatus of claim 41, wherein:
a) said nozzles are arranged in first and second tiers spaced axially along said shell.

46. The apparatus of claim 45, wherein:
a) there is a uniform number of nozzles in each said tier.

* * * * *